United States Patent
Hayashi et al.

(10) Patent No.: US 7,113,314 B2
(45) Date of Patent: Sep. 26, 2006

(54) SUPPORT STRUCTURE FOR REFLECTORS ON HALF RATE CARRIAGE

(75) Inventors: Eiichi Hayashi, Saitama (JP); Yuichi Kawanabe, Saitama (JP)

(73) Assignee: Fujinon Corporation, (JP)

( * ) Notice: Subject to any disclaimer, the term of this patent is extended or adjusted under 35 U.S.C. 154(b) by 954 days.

(21) Appl. No.: 10/106,180

(22) Filed: Mar. 26, 2002

(65) Prior Publication Data

US 2002/0141000 A1  Oct. 3, 2002

(30) Foreign Application Priority Data

Mar. 30, 2001  (JP) .............................. 2001-102650

(51) Int. Cl.
*H04N 1/04* (2006.01)
(52) U.S. Cl. .................... 358/475; 358/497; 358/474
(58) Field of Classification Search ................ 358/475, 358/509, 497, 494, 474, 471, 401, 501, 487, 358/506, 505, 496; 250/234–236, 216, 239; 399/211, 212; 355/66, 67, 40, 41, 43; 359/212, 359/850, 196; 382/312, 318, 319
See application file for complete search history.

(56) References Cited

U.S. PATENT DOCUMENTS 4,634,261 A * 1/1987 Nagoshi ..................... 399/212

6,641,272 B1 * 11/2003 Hsu et al. .................... 359/857

FOREIGN PATENT DOCUMENTS

JP          08151145          6/1996
JP       2002142077 A   *   5/2002

OTHER PUBLICATIONS

U.S. Appl. No. 09/725,600, filed Nov. 29, 2000, entitled Optical Scanner Assembly.
U.S. Appl. No. 09/725,831, filed Nov. 29, 2000, entitled Optical Scanner Assembly.
U.S. Appl. No. 10/083,946, filed Feb. 27, 2002, entitled Optical Path Structure of Optical Scanner Assembly.

* cited by examiner

*Primary Examiner*—Cheukfan Lee
(74) *Attorney, Agent, or Firm*—Price, Heneveld, Cooper, DeWitt & Litton, LLP

(57) ABSTRACT

A support structure for supporting reflectors on a half rate carriage in an image reader has an angle between a reflecting surface of a second reflector and an optical path from a first reflector of a full rate carriage to the second reflector is greater than 45° and less than 90°, for example about 53°, and an angle between the reflecting surface of the second reflector and a reflector of a third reflector is 90°. Thus, the degree of overlaying of the full rate carriage with the half rate carriage is increased and the image reader is miniaturized.

11 Claims, 5 Drawing Sheets

SUPPORT STRUCTURE FOR REFLECTORS ON HALF RATE CARRIAGE

BACKGROUND OF THE INVENTION

1. Field of the Invention

The present invention relates to a stationary original type image reader and particularly to a support structure for supporting reflectors on a half rate carriage that moves by half of the moving distance of a light source lamp for keeping an optical path length constant from the image-formed surface of the original to an image-processing part of the image reader.

2. Description of the Related Art

FIG. 4 is a schematic diagram illustrating the configuration of a conventional stationary original type image reader, such as one disclosed in Japanese Patent Laid-Open Publication No. Hei. 9-331425 (1997), to read image data from an original on a platen glass. As shown in the figure, an image reader 1, such as a copying machine or a scanner, is provided to read image data of an original (e.g., a paper document) or the like placed on a platen glass 9 to subject the image data to various kinds of processing. The image reader 1 utilizes movable carriages 3 and 4 for scanning the original. Carriage 3 includes light source lamps 5 for irradiating the original with light beams and a reflector 10 mounted thereon. Carriage 4 includes reflectors 11 and 12 mounted thereon. These reflectors 10, 11, 12 form an optical path for guiding the desired image data from the original to an image-processing part 7 such as a CCD (Charge-Coupled Device). Therefore, the image formed on the original can be scanned by moving the carriages 3 and 4 along the original to pick up the image information from the original.

In other words, the optical path length from the image-formed surface of the original to the image-processing part 7 must be kept at a constant length even though each of the carriages 3 and 4 moves. Therefore, as described above, the image reader 1 has a combined structure of the full rate carriage 3 and the half rate carriage 4. Typically, the half rate carriage 4 is moveable by half of the moving distance of the full rate carriage 3. More specifically, as described above, the first reflector 10 for receiving the image from the original is mounted on the full rate carriage 3. The second reflector 12 for receiving the reflected image from the first reflector 10 and the third reflector 13 for receiving the reflected image from the second reflector 12 are mounted on the half rate carriage 4, respectively. The reflected image from the third reflector 13 is then incident on the image-processing element 7.

Each of the carriages 3 and 4 is arranged so as to move in parallel with the image-formed surface of the original. It means that an optical path 8 between the carriages 3 and 4 should be also in parallel with the image-formed surface of the original and in a direction along which each of the carriages 3 and 4 moves. Therefore, the first reflector 10 is arranged at an angle of 45° with respect to the platen glass 9.

As shown in FIG. 5, the reflected light beams from the first reflector 10 is transmitted to the second reflector 11 along the optical path 8. Then, the second reflector reflects the light beams to the third reflector 12. Subsequently, the reflected light beams from the third reflector 12 travels in the direction parallel to the optical path 8. In this case, furthermore, the support structure of each of the second and third reflectors 11 and 12 on the above half rate carriage 4 is constructed such that the second reflector 11 and the third reflector 12 form a right angle (i.e., 90°), while the second reflector 11 is arranged at an angle of 45° with respect to the optical path 8 of the reflected light beams from the first reflector 10.

Furthermore, each of the full rate and half rate carriages 3 and 4 moves as wire 14 (FIG. 4) moves. That is, carriages 3 and 4 are engaged on the wire 14 which is wound up around a pulley 15 by the driving force of a motor (not shown). The movement of such a wire 14 is guided with pulleys 16 and 18. As indicated by the double-dashed line in FIG. 5, carriages 3 and 4 are overlapped on one another in part when the full rate carriage 3 moves to the fullest extent in the direction toward the half rate carriage 4. In this case, the carriages 3 and 4 are able to come closer to one another as far as the first and second reflectors 10, 11 come into contact with one another.

However, it is difficult to sufficiently overlay the full rate carriage 3 and the half rate carriage 4 when these carriages 3 and 4 come into contact with one another. As described above, the reason is that the support structure of each reflector 11 and 12 on the above half rate carriage 4 is constructed such that the second and the third reflectors 11 and 12 are arranged at 90° with respect to one another and the second reflector 11 is arranged at an angle of 45° with respect to the optical path 8 of the reflected light beams from the first reflector 10. In other words, there is a comparatively large space under the first reflector 10 of the full rate carriage 3. When these carriages 3 and 4 come into contact with one another to bring the first and second mirrors 10 and 11 closer, such a space can be formed between the first reflector 10 of the full rate carriage 3 and the third reflector 12 of the half rate carriage 4.

It would be desirable to provide a support structure of each reflector on the half rate carriage that allows the full rate carriage 3 to slide into the half rate carriage 4 so as to make them closer by the distance of such a space.

SUMMARY OF THE INVENTION

Therefore, it is an object of the present invention to provide a support structure for supporting reflectors on a half rate carriage whereby a full rate carriage can be moved into the half rate carriage more deeply.

As the technical means for attaining the above object, the present invention provides a support structure for supporting reflectors on a half rate carriage in an image reader. The image reader comprises a full rate carriage on which a light source and a first reflector are mounted and a half rate carriage on which a second reflector and a third reflector are mounted. The image reader is moveable for irradiating an original with light beams from the light source lamp while moving the carriages along the original and to read the reflected light beams as image data after reflecting the light beams on the first reflector, the second reflector, and the third reflector in sequence. In the image reader, an angle between a reflecting surface of the second reflector and an optical path from the first reflector to the second reflector is greater than 45° but less than 90°. The angle between the reflecting surface of the second reflector and a reflector of the third reflector is 90°.

According to the present invention, the light beams emitted from the light source illuminates the original. The reflected light beams from the original is then incident on the second reflector after reflecting on the first reflector. Subsequently, the reflected light beams from the second reflector is incident on an image-processing part after reflecting on the third reflector. Consequently, the image-processing element reads the light beams as the image data obtained from the original.

According to the present invention, furthermore, the angle between the reflecting surface of the second reflector and the optical path from the first reflector to the second reflector is greater than 45° and less than 90° and the angle between the reflecting surface of the second reflector and the reflecting surface of the third reflector is 90°. Therefore, the second reflector is located at a position farther from the full rate carriage as compared with the third reflector.

Furthermore, the second reflector is made to be inclined more than the third reflector with respect to the optical path. Even if the width of the second reflector is smaller than the width of the third reflector, the reflected light beams from the second reflector does not pass through the outside of the width of the third reflector. Thus, the light can be picked up without leaking. Therefore, the second reflector can be made smaller than the third reflector. In other words, the first reflector approaches the second reflector when the full rate carriage approaches the half rate carriage. As a result, the overlaying portion between these mirrors becomes large, and the overlaying area between the carriages increases.

In the support structure for supporting reflectors of the half rate carriage of the present invention, the angle between the reflecting surface of the second reflector and the optical path from the first reflector to the second reflector may be about 53°.

By adopting this angle (i.e., about 53°), the degree of overlaying the full rate carriage on the half rate carriage becomes the maximum by the difference between the distance from the full rate carriage to the second reflector and the distance from the full rate carriage to the third reflector and by miniaturizing the second reflector.

In the support structure for supporting reflectors of the half rate carriage of the present invention, the width of the second reflector may be smaller than the width of the third reflector.

By adopting such a configuration, the first reflector approaches the second reflector more closely. Therefore, the degree of overlaying the full rate carriage on the half rate carriage increases, expediting the miniaturization of the image reader.

These and other features, objects and advantages of the present invention will become apparent upon reading the following description thereof together with reference to the accompanying drawings.

DETAILED DESCRIPTION OF THE EMBODIMENTS

Figure 2:
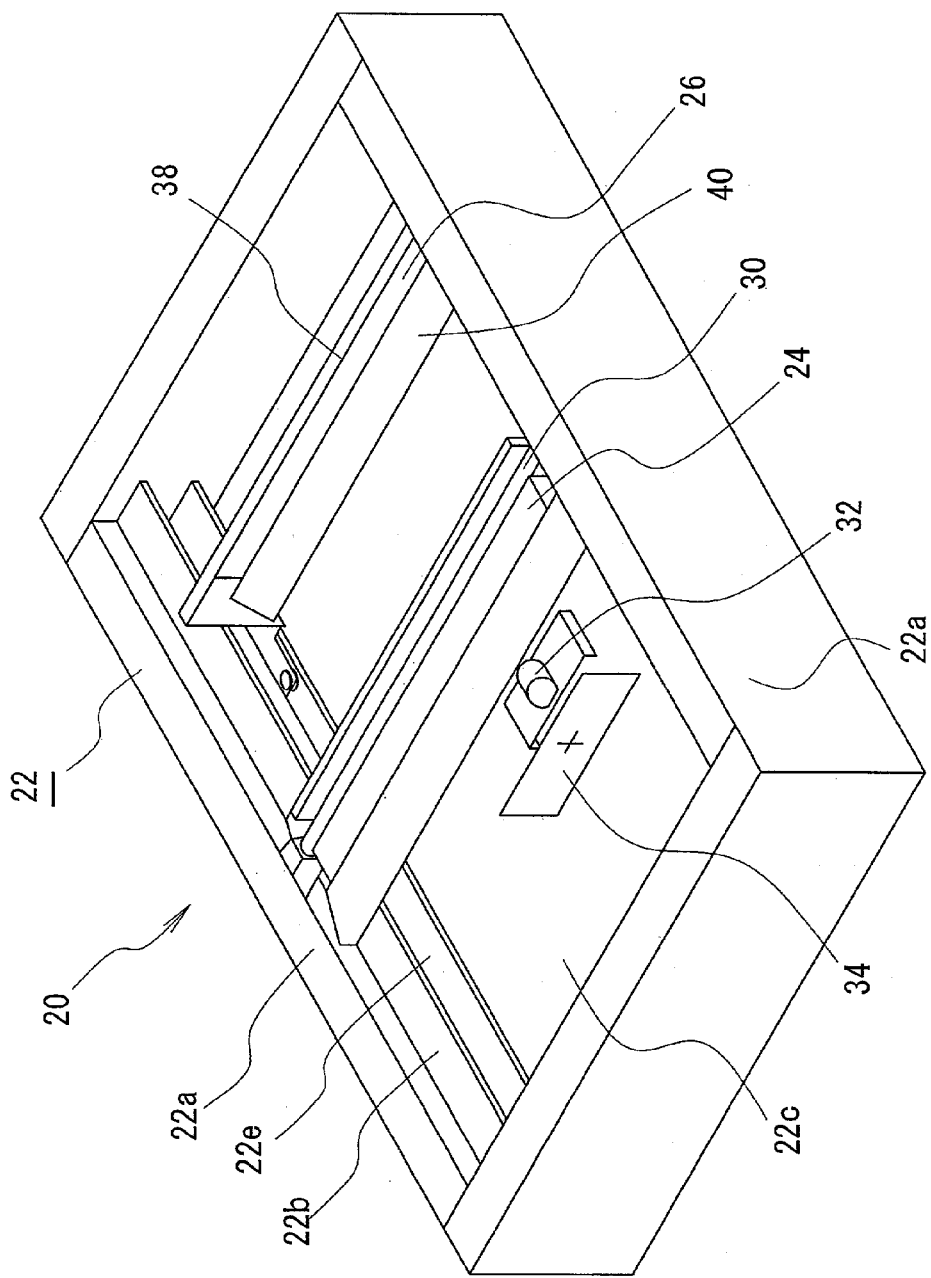
FIG. 2 is a schematic perspective view of an image reader embodying the present invention.
Figure 3:
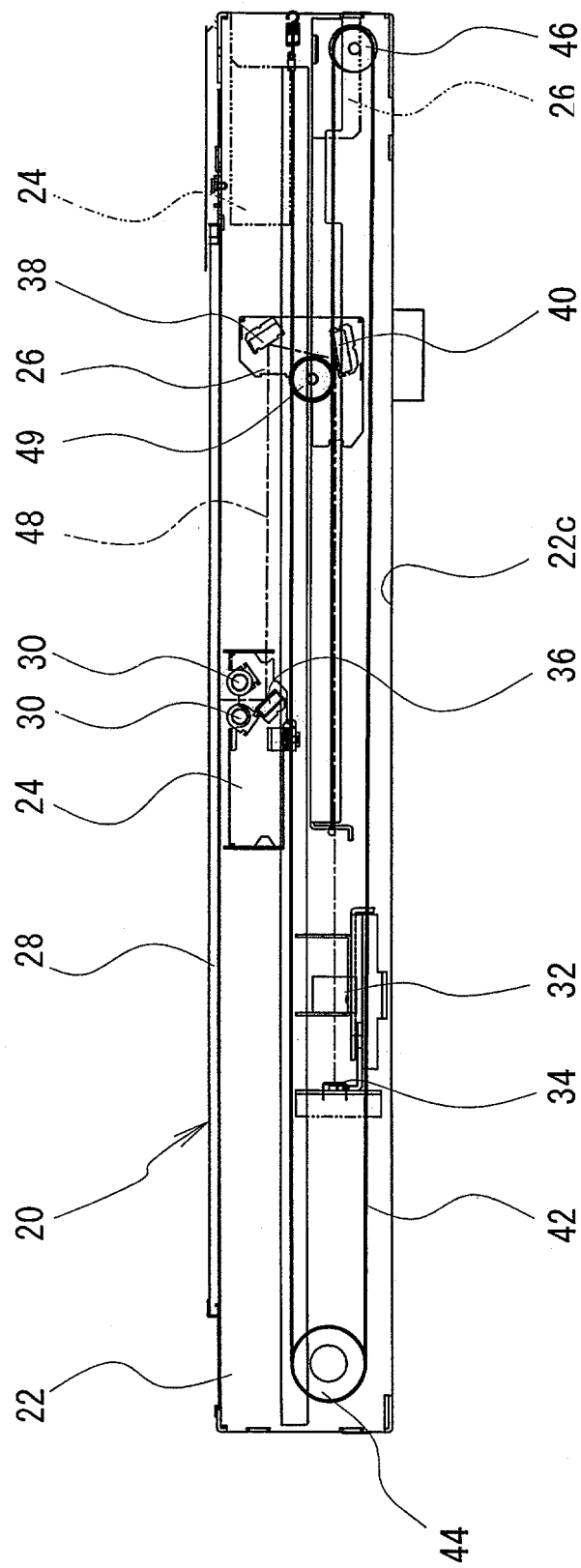
FIG. 3 is a schematic side view of the image reader shown in FIG. 2.
Figure 4:
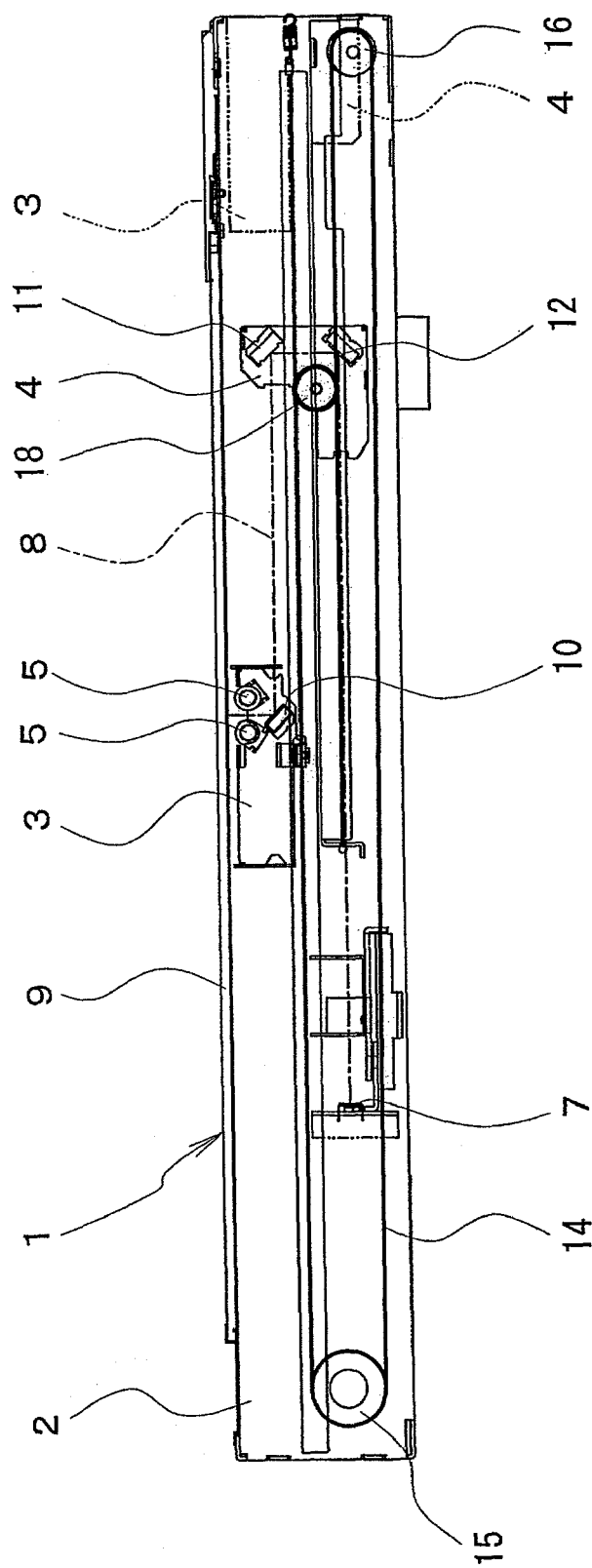
FIG. 4 is a schematic side view of a conventional prior art image reader.

Referring initially to FIG. 2, there is shown a schematic perspective view of a stationary original type image reader 20 supporting reflectors of the half rate carriage. FIG. 3 is a schematic side view of the image reader 20. The image reader 1 comprises a casing 22 having vertically spaced guide plates 22b, 22e arranged in parallel on the inner side walls 22a that extend in the longitudinal direction of casing 22. As shown in the figure, a full rate carriage 24 is mounted on the guide plate 22b, while a half rate carriage 26 is mounted on the guide plate 22e. These carriages 24 and 26 can be guided with their respective guide plates 22b, 22e for moving in a longitudinal direction of casing 22. In addition, there is a platen glass 28 (FIG. 3) attached on the top of the casing 22 for receiving an original to be scanned which is placed on the platen glass 28. A light source lamp 30 such as a fluorescent lamp is mounted on the full rate carriage 24 and is used to irradiate the original with light beams. Also, an image forming lens 32 and a photoelectric converter device 34, such as a CCD, are appropriately arranged on the bottom plate 22c of the casing 22.

A first reflector 36 is arranged on the full rate carriage 24, while a second reflector 38 and a third reflector 40 are arranged on the half rate carriage 26. These reflectors 36, 38, 40 are arranged to form an optical path from the original to the photoelectric converter device 34 through an image forming lens 32. The original reflects light beams from the light source lamp 30, and the light beams reflected from the original are incident on the photoelectric converter device 34 after being reflected by each of the first, second, and third reflectors 36, 38, 40 in sequence.

For obtaining the image information from the original, as described above, the entire area of the original should be irradiated with light beams from the light source lamps 30, so that the full rate carriage 24 is moveable over the entire area of the platen glass 28. In this case, the above optical path from the original to the photoelectric converter device 34 should be kept at a constant length even though the full rate carriage 24 moves. For this reason, the optical path can be kept at a constant length by synchronizing the movement of the half rate carriage 26 with that of the full rate carriage 24 under the conditions in which the movement of the half rate carriage 26 is set to almost half of the movement of the full rate carriage 24. Each of the carriages 24, 26 is conventionally connected with a wire 42 routed over pulleys 44, 46, 49 so as to provide the synchronized sliding movement of each carriage 24, 26.

Figure 1:
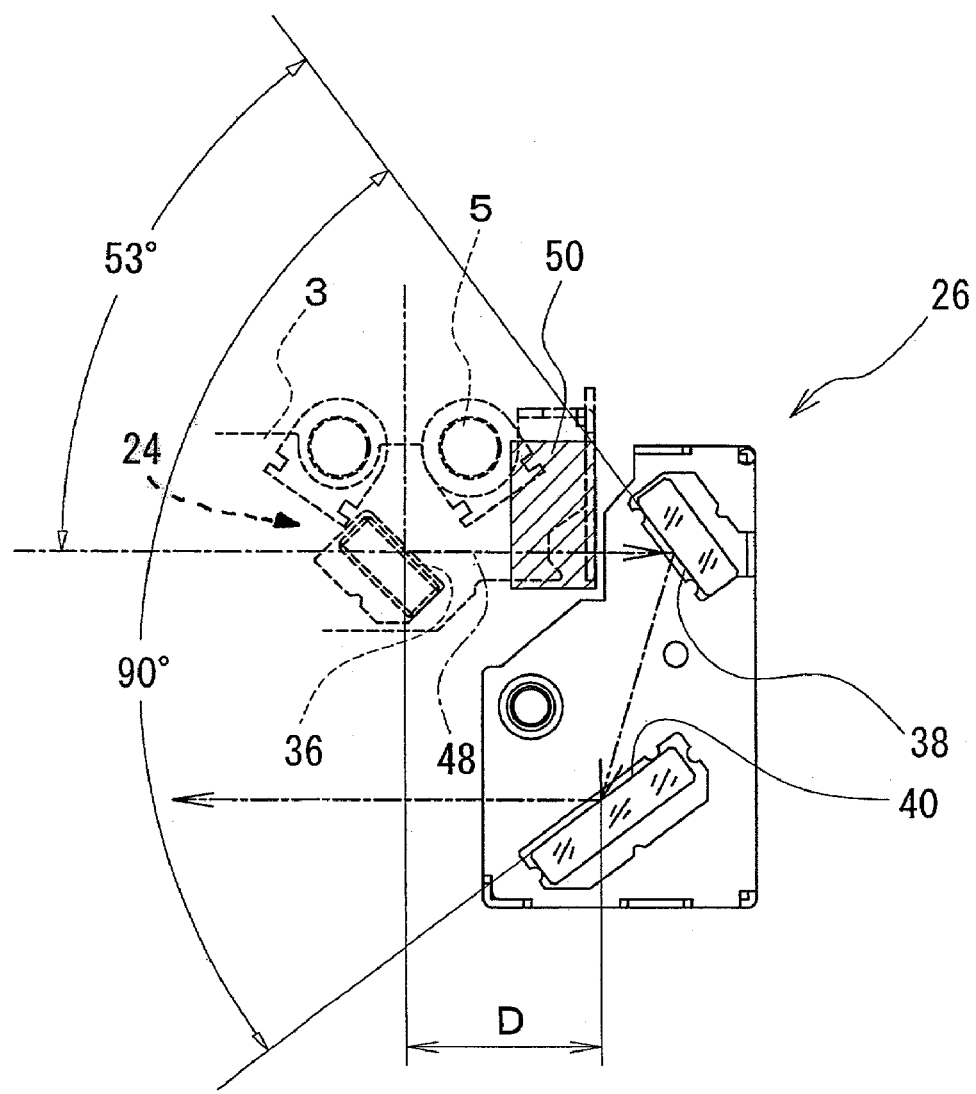
FIG. 1 is a schematic side view of a support structure for supporting reflectors of a half rate carriage in accordance with the present invention.

The support structure for supporting reflectors of the half rate carriage 26 in accordance with the present embodiment is shown in FIG. 1. Reflectors 36, 38, 40 are arranged in place such that the angle between an optical path 48 from the first reflector 36 to the second reflector 38 and the reflecting surface of the second reflector 38 is greater than 45° and less than 90°. The angle between the reflecting surfaces of the second reflector 38 and the third reflector 40 is 90°. In the preferred embodiment of the present invention, the angle between the optical path 48 and the reflecting surface of the second reflector 38 is about 53°. Also, the dimensions of the second reflector 38 are smaller than those of the third reflector 40. The action of the above support structure for supporting reflectors 38, 40 of the half rate carriage 26 is now described in connection with the preferred embodiment of the present invention shown in FIGS. 1–3.

Light beams emitted from the light source lamp 30 illuminates an original on the platen glass 28 and is reflected therefrom. Subsequently, the reflected light beams are incident on and reflected off the first reflector 36, and are then incident on the second reflector 38. The reflected light beams from the second reflector 38 are further reflected off the third reflector 40 and are then returned in parallel with the direction of light beams from the first reflector 36. The reflected light beams are then conventionally guided into the photoelectric converter device 34 and converted into electric signals, resulting in the desired image information.

As described above, the reflectors 36, 38, 40 are arranged in place such that the angle between the optical path 48 from the first reflector 36 to the second reflector 38 and the reflecting surface of the second reflector 38 is more than 45° and less than 90° in addition to the angle between the reflecting surfaces of the second reflector 38 and the third reflector 40 is 90°. As a result, the second reflector 38 can be located at a position more distant from the full rate carriage 24 than the third reflector 40. Furthermore, the second reflector 38 is inclined more than the third reflector 40 with respect the optical path 48. Even if the width of the second reflector 38 is smaller than the width of the third reflector 40, the reflected light beams from the second reflector 38 does not pass through the outside of the width of the third reflector 40. Therefore, the reflected light beams from the second reflector 38 can be captured by the third reflector 40 without leaking. As a result, the second reflector 38 can be smaller than the third reflector 40.

Figure 5:
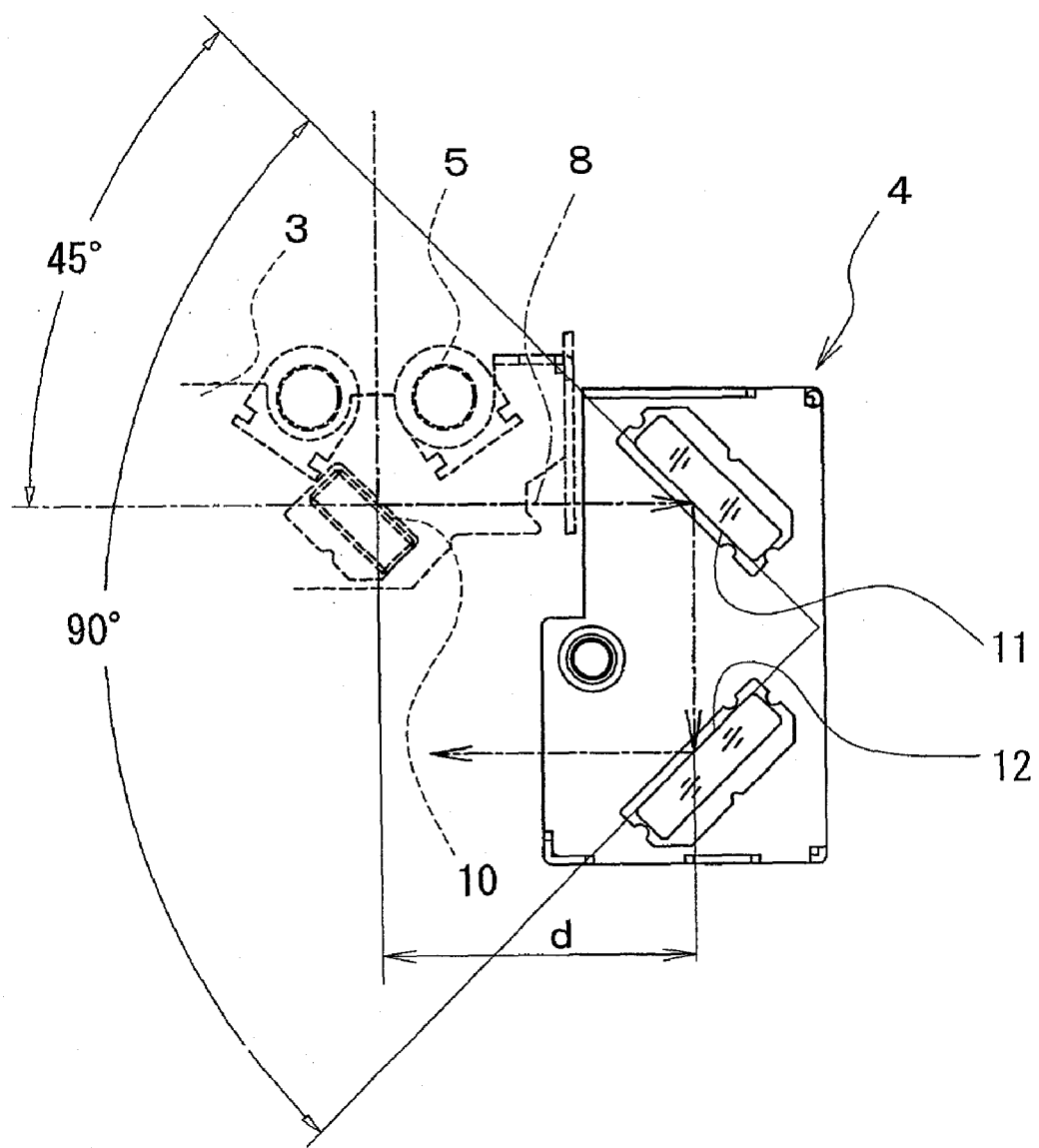
FIG. 5 is a schematic side view of a conventional prior art support structure for supporting reflectors of a half rate carriage.

In the half rate carriage 26 of the present embodiment, therefore, the second reflector 38 can be made smaller than the third reflector 40 and can be located at a position more distant from the full rate carriage 24 than the third reflector 40. Thus, as shown in FIG. 1, the empty space 50 (shown as the shaded area), which does not exist in the conventional half rate carriage 4, can be formed on the second reflector 38 on the full rate carriage 24 side and on the upper side of the third reflector 40. The first reflector 36 can thus be guided into the empty space area 50, so that the degree of overlaying between the full rate carriage 24 and the half rate carriage 26 is increased. In the conventional supporting structure for supporting the reflectors as shown in FIG. 5, the second reflector 11 and the third reflector 12 are substantially of the same size. In addition, the ends of these reflectors 11, 12 on the side of the full rate carriage 3 are located almost at the same 45° position in the direction of an optical path 8. In the supporting structure of the present embodiment as shown in FIG. 1, on the other hand, the second reflector 38 is more distant from the full rate carriage 24 than the third reflector 40. In addition, the end of the third reflector 40 on the side of the full rate carriage 24 is closer to the full rate carriage 24 than the end of the second reflector 38 on the side of the full rate carriage 24 in the direction of the optical path 48. Therefore, the full rate carriage 24 can be guided into the area above the third reflector 40. That is, the distance "D" between the first reflector 36 and the third reflector 40 in FIG. 1 can be made smaller than the distance "d" between the first reflector 8 and the third reflector 12 in FIG. 5. Therefore, as indicated by the double-dashed line in FIG. 3, the amount of outwardly extending the half rate carriage 26 decreases when the carriage 24 approaches the carriage 26 at the end (i.e., the carriage 24 is located at an initial position), so that the image reader 20 can be miniaturized.

According to the present embodiment, furthermore, the angle between the optical path 48 and the reflecting surface of the second reflector 38 is preferably set to about 53°. Therefore, the length of the part of the full rate carriage 24 to be guided into the half rate carriage 26 can be maximized by the difference between the distance from the second reflector 38 to the full rate carriage 24 and the distance from the third reflector 40 to the full rate carriage 24 and by miniaturizing the second reflector 38.

In the present embodiment, furthermore, the angle between the optical path 48 and the reflecting surface of the second reflector 38 is set to about 53°. According to the present invention, however, it is not limited to such a degree. The angle may be greater than 45° and less than 90°. Accordingly, the second reflector 38 can be inclined more than the third reflector 40 with respect to the optical path 48 and also can be miniaturized, so that the degree of guiding the full rate carriage 24 into the half rate carriage 26 can be increased.

In the present embodiment, furthermore, the second reflector 38 is miniaturized. According to the present invention, however, it is not limited to such a configuration. The empty space 50 can be formed on the full rate carriage 24 side by inclining the second reflector 38 even though the size of the second reflector 38 is substantially equal to the conventional one. In this case, the conventional reflector components may be directly used as the second reflector components, or the second reflector 38 and the third reflector 40 may share their components together.

As described above, in the structure for supporting each of the reflectors of the half rate carriage 26 in accordance with the present invention, the reflectors 36, 38, 40 are arranged in place such that the angle between the optical path 48 from the first reflector 36 to the second reflector 38 and the reflecting surface of the second reflector 38 is more than 45° and less than 90° in addition to the angle between the reflecting surface of the second reflector 38 and the third reflector 40 is 90°. Therefore, the second reflector 38 can be located at a position more distant from the full rate carriage 24 than the third reflector 40. Furthermore, the second reflector 38 is inclined more than the third reflector 40 with respect the optical path 48 and the second reflector 38 can be prepared smaller than the third reflector 40. Therefore, the empty space 50 which does not exist in the conventional half rate carriage 4 can be formed in the half rate carriage 26 of the present invention. The full rate carriage 24 can be guided into such an empty space 50, so that the degree of overlaying between the full rate carriage 24 and the half rate carriage 26 is increased. As a result, the amount of outwardly extending the half rate carriage 26 decreases when the carriage 24 approaches the carriage 26 at the most (i.e., the carriage 24 is located at an initial position), so that the image reader 20 can be miniaturized.

Furthermore, in the structure for supporting the reflectors of the half rate carriage in accordance with the present invention, the angle between the reflecting surface of the second reflector 38 and the optical path 48 from the first reflector 36 to the second reflector 38 may be about 53°. By adopting this angle (i.e., about 53°), the degree of overlaying the full rate carriage 26 on the half rate carriage 24 becomes the maximum by the difference in the distances from the full rate carriage 26 to the second and third reflectors 38, 40 and by the miniaturization of the second reflector 38. Thereby, the image reader can be miniaturized.

In the support structure for supporting reflectors of the half rate carriage of the present invention, the width of the second reflector 38 may be smaller than the width of the third reflector 40. By adopting such a configuration, the first reflector 36 approaches the second reflector 38 more closely. Therefore, the degree of overlaying the full rate carriage 24 on the half rate carriage 26 increases, so that the miniaturization of the image reader 20 can be facilitated.

It will become apparent to those skilled in the art that various modifications to the preferred embodiment of the invention as described herein can be made without departing from the spirit or scope of the invention as defined by the appended claims.

What is claimed is:

1. An image reader having a full rate carriage on which a light source lamp and a first reflector are mounted and including a support structure for supporting reflectors on a half rate carriage on which a second reflector and a third reflector are mounted, said light source lamp for irradiating an original with light beams while moving said carriages along the original to read the reflected light beams as image data after reflecting said light beams on said first reflector, said second reflector, and said third reflector in sequence, wherein said support structure comprises:
said second reflector positioned such that an angle between a reflecting surface of said second reflector and an optical path from said first reflector to said second reflector is greater than 45° and less than 90°; and
said third reflector positioned such that an angle between the reflecting surface of said second reflector and a reflecting surface of said third reflector is 90°.

2. The support structure for supporting reflectors on a half rate carriage as defined in claim 1, wherein the angle between the reflecting surface of said second reflector and the optical path from the first reflector to the second reflector is about 53°.

3. The support structure for supporting reflectors on a half rate carriage as defined in claim 2, wherein a width of said second reflector is less than a width of said third reflector.

4. The support structure for supporting reflectors on a half rate carriage as defined in claim 1, wherein a width of said second reflector is less than a width of said third reflector.

5. An image reader comprising:
a full rate carriage on which a light source lamp and a first reflector are mounted for irradiating an original with light beams from the light source lamp; and
a half rate carriage on which a second reflector and a third reflector are mounted to read the reflected light beams as image data while moving said full and half rate carriages along the original after reflecting the light beams on said first reflector, said second reflector, and said third reflector in sequence, wherein an angle between a reflecting surface of said second reflector and an optical path from said first reflector to said second reflector is greater than 45° and less than 90°, while the angle between the reflecting surface of said second reflector and a reflecting surface of said third reflector is 90°.

6. The image reader as defined in claim 5, wherein the angle between the reflecting surface of said second reflector and the optical path from said first reflector to said second reflector is about 53°.

7. The image reader as defined in claim 6, wherein a width of said second reflector is less than a width of said third reflector.

8. An image reader having a full rate carriage on which a light source lamp and a first reflector are mounted and including a support structure for supporting reflectors on a half rate carriage on which a second reflector and a third reflector are mounted for irradiating an original with light beams from said light source lamp while moving said carriages along the original to read the reflected light beams as image data after reflecting said light beams on said first reflector, said second reflector, and said third reflector in sequence, wherein the improvement comprises:
an angle between a reflecting surface of said second reflector and an optical path from said first reflector to said second reflector is greater than 45° and less than 90°, and an angle between the reflecting surface of said second reflector and a reflecting surface of said third reflector is 90°.

9. The support structure for supporting reflectors on a half rate carriage as defined in claim 8, wherein the angle between the reflecting surface of the second reflector and the optical path from the first reflector to the second reflector is about 53°.

10. The support structure for supporting reflectors on a half rate carriage as defined in claim 9, wherein a width of said second reflector is less than a width of said third reflector.

11. The support structure for supporting reflectors on a half rate carriage as defined in claim 8, wherein a width of said second reflector is less than a width of said third reflector.

* * * * *